(12) United States Patent
Hirai et al.

(10) Patent No.: US 11,710,928 B2
(45) Date of Patent: Jul. 25, 2023

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hiroki Hirai, Mie (JP); Housei Mizuno, Mie (JP); Koichiro Goto, Mie (JP); Junichi Shirakawa, Mie (JP); Motohiro Yokoi, Mie (JP); Kenta Ito, Mie (JP); Suguru Yasuda, Mie (JP); Yoshitaka Kami, Osaka (JP); Yasushi Nomura, Osaka (JP); Sofia Barillaro, Osaka (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 104 days.

(21) Appl. No.: 17/276,674

(22) PCT Filed: Aug. 30, 2019

(86) PCT No.: PCT/JP2019/034091
§ 371 (c)(1),
(2) Date: Mar. 16, 2021

(87) PCT Pub. No.: WO2020/059462
PCT Pub. Date: Mar. 26, 2020

(65) Prior Publication Data
US 2021/0273378 A1    Sep. 2, 2021

(30) Foreign Application Priority Data
Sep. 19, 2018 (JP) .................................. 2018-175385

(51) Int. Cl.
*H01R 13/631* (2006.01)
*H01B 7/08* (2006.01)
(Continued)

(52) U.S. Cl.
CPC ......... *H01R 13/631* (2013.01); *H01B 7/0846* (2013.01); *H01R 13/50* (2013.01); *H01R 43/26* (2013.01); *H01R 2201/26* (2013.01)

(58) Field of Classification Search
CPC ...... H01R 13/631; H01R 13/50; H01R 43/26; H01R 2201/26; H01B 7/0846; H01B 7/36; B60R 16/0215
See application file for complete search history.

(56) References Cited

U.S. PATENT DOCUMENTS

| | | | |
|---|---|---|---|
| 5,895,889 A | 4/1999 | Uchida et al. | |
| 6,447,301 B1 * | 9/2002 | Hayashi | H01R 4/2433 439/34 |

(Continued)

FOREIGN PATENT DOCUMENTS

| | | |
|---|---|---|
| CN | 102207368 | 10/2011 |
| JP | 6-28922 | 2/1994 |

(Continued)

OTHER PUBLICATIONS

Japan Office Action issued in Japan Patent Application No. 2020-31929, dated May 10, 2022, together with English translation thereof.

(Continued)

*Primary Examiner* — Abdullah A Riyami
*Assistant Examiner* — Nader J Alhawamdeh
(74) *Attorney, Agent, or Firm* — Greenblum & Bernstein, P.L.C.

(57) ABSTRACT

A wiring member includes a wire-like transmission member, a holding member, and a connector. The holding member is
(Continued)

configured to hold the wire-like transmission member two-dimensionally in a positioned state. The connector is attached to an end portion of the wire-like transmission member. The connector is provided with an orientation recognition mark.

9 Claims, 7 Drawing Sheets

(51) Int. Cl.
*H01R 13/50* (2006.01)
*H01R 43/26* (2006.01)

(56) References Cited

U.S. PATENT DOCUMENTS

| | | | | |
|---|---|---|---|---|
| 11,407,368 | B2* | 8/2022 | Matsuyama | H02G 3/0481 |
| 11,448,531 | B2* | 9/2022 | Yamamoto | G01P 1/02 |
| 11,451,036 | B2* | 9/2022 | Nishimura | F16B 5/126 |
| 2006/0035516 | A1* | 2/2006 | Wu | H01R 12/79 |
| | | | | 439/492 |
| 2008/0090460 | A1* | 4/2008 | Hashiguchi | H01R 9/2416 |
| | | | | 439/626 |
| 2011/0234789 | A1 | 9/2011 | Koike | |
| 2011/0237138 | A1* | 9/2011 | Yamada | H01R 13/4226 |
| | | | | 439/733.1 |
| 2013/0288528 | A1* | 10/2013 | Sakaizawa | H01R 24/66 |
| | | | | 439/626 |
| 2014/0012416 | A1 | 1/2014 | Negishi et al. | |
| 2016/0016229 | A1 | 1/2016 | Czinger et al. | |
| 2016/0134038 | A1* | 5/2016 | Tomikawa | H05K 1/0216 |
| | | | | 29/842 |
| 2017/0361464 | A1 | 12/2017 | Sasaki | |
| 2021/0273378 | A1* | 9/2021 | Hirai | B60R 16/0215 |
| 2022/0263298 | A1* | 8/2022 | Nishimura | H01B 7/08 |
| 2022/0293299 | A1* | 9/2022 | Kudo | H01B 7/40 |

FOREIGN PATENT DOCUMENTS

| | | |
|---|---|---|
| JP | 8-138826 | 5/1996 |
| JP | 9-35539 | 2/1997 |
| JP | 2006-244748 | 9/2006 |
| JP | 2006-244935 | 9/2006 |
| JP | 2008-235717 | 10/2008 |
| JP | 2009-032737 | 2/2009 |
| JP | 2012-200805 | 10/2012 |
| JP | 2014-231110 | 12/2014 |
| JP | 2017-27693 | 2/2017 |
| JP | 2017-524600 | 8/2017 |
| JP | 2017-226029 | 12/2017 |
| JP | 2018-14218 | 1/2018 |
| JP | 2018-73495 | 5/2018 |

OTHER PUBLICATIONS

International Search Report issued International Patent Application No. PCT/JP2019/034091, dated Oct. 1, 2019, along with an English translation thereof.

International Preliminary Report on Patentability issued in International Patent Application No. PCT/JP2019/034091, dated Apr. 9, 2020, along with an English translation thereof.

China Office Action issued in China Patent Application No. 201980060606.5, dated May 30, 2022, together with English translation thereof.

Japan Office Action issued in Japan Patent Application No. 2020-31929, dated Oct. 18, 2022, together with English translation thereof.

China Office Action issued in China Patent Application No. 201980060606.5, dated Apr. 1, 2023, together with English translation thereof.

* cited by examiner

WIRING MEMBER

TECHNICAL FIELD

The present disclosure relates to a wiring member.

BACKGROUND ART

Patent Document 1 discloses a technology in which a line of connectors is formed by coupling a plurality of connectors in predetermined order, and the line of connectors and loose parts of paired electric wires between the connectors are accommodated in a guide case. Patent Document 1 discloses a configuration in which the robot holds the guide case, sends out the connectors one by one from the one in front, and assembles the connectors to a target side.

Further, Patent Document 2 discloses a technology in which a plurality of connector holders are provided with a bobbin around which a wire harness is wound, and a plurality of connectors of the wire harness are thus held onto the connector holders one by one. Patent Document 2 discloses a configuration in which a container, which consists of the wire harnesses being wound around the bobbin, is attached to a robot, and the connectors are assembled to target connectors one by one.

PRIOR ART DOCUMENTS

Patent Documents

Patent Document 1: Japanese Patent Application Laid-Open No. 2006-244748
Patent Document 2: Japanese Patent Application Laid-Open No. 2006-244935

SUMMARY

Problem to be Solved by the Invention

Assembly operation of the wire harness to the vehicle and coupling operation (connector fitting operation) between the wire harness and an auxiliary apparatus have hitherto been performed manually.

In recent years, reduction of workforce caused along with reduction in population and low birthrates and longevity has been a matter of concern. Many of manufacture operations of vehicles are manually performed, and thus securing workforce may present a problem.

In order to solve the problem, automation of a vehicle manufacture process has been attracting attention. Further, with the aim of reducing manufacture costs and achieving higher efficiency of processes as well, automation has been put forth.

When automation of the fitting operation of the connectors is intended, the robot needs to perform the fitting operation by correctly recognizing the positions and orientations of connectors on the wire harness side and connectors on the auxiliary apparatus side. However, in a case of a conventional wire harness structure (electric wire bundles), the degree of freedom of the movement of the wire harness is significantly high, and also the connectors themselves do not have a structure capable of fixedly maintaining the positions and orientations. Thus, it is difficult to recognize and hold the connector aimed by the robot, and it is difficult for the robot to perform the operation of fitting the connectors together.

However, in the technologies disclosed in Patent Documents 1 and 2, the connectors need not be held in the guide case or in the connector holders of the bobbin at the stage of manufacture of the wire harness. Thus, there is a great limitation on the wire harness. For example, the technologies are difficult to be applied when the wire harness branches halfway.

In view of this, the present disclosure has an object to provide a wiring member appropriate for performing operation of connecting a connector to a target connector by using a robot.

Means to Solve the Problem

A wiring member according to the present disclosure includes: a wire-like transmission member; a holding member configured to hold the wire-like transmission member two-dimensionally in a positioned state; and a connector being attached to an end portion of the wire-like transmission member, and being provided with an orientation recognition mark.

Effects of the Invention

According to the present disclosure, the wiring member appropriate for performing operation of connecting the connector to the target connector by using a robot can be provided.

DESCRIPTION OF EMBODIMENTS

Description of Embodiment of Present Disclosure

Figure 1:
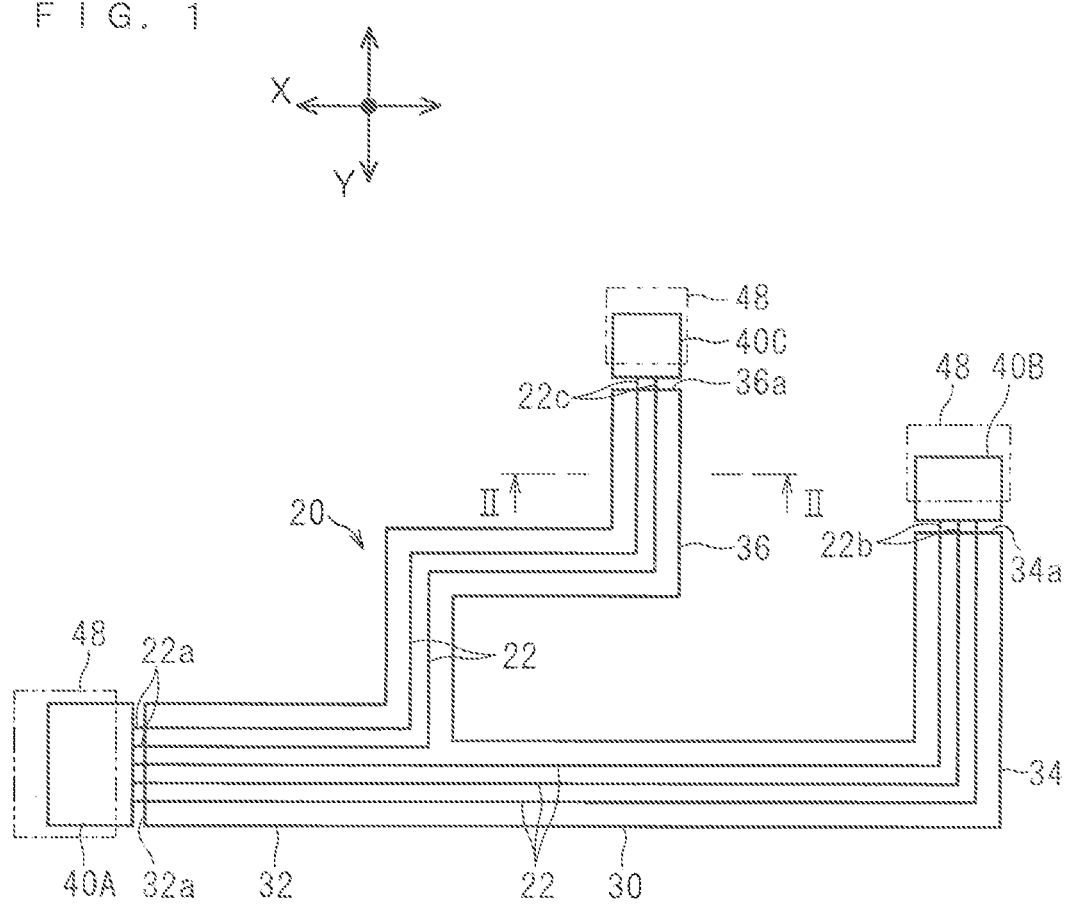
FIG. 1 is a schematic plan view illustrating a wiring member according to an embodiment.

First, aspects of an embodiment of the present disclosure will be listed below.

A wiring member according to the present disclosure is as follows.

(1) A wiring member includes: a wire-like transmission member; a holding member configured to hold the wire-like transmission member two-dimensionally in a positioned state; and a connector being attached to an end portion of the wire-like transmission member, and being provided with an orientation recognition mark.

In this case, the wire-like transmission member is held two-dimensionally in a positioned state by the holding member, and the connector is attached to the end portion of the wire-like transmission member. Thus, the position of the connector is determined in some degree by the holding member, and thus the robot can easily hold the connector. Further, the connector is provided with the orientation recognition mark. Thus, the robot can recognize the orientation of the connector based on the orientation recognition mark, and based on the recognition results, the robot can perform holding of the connector and connection to the target connector. Therefore, the wiring member is appropriate for performing the operation of connecting the connector to the target connector by using the robot.

(2) The holding member may be a sheet member including a main surface on which the wire-like transmission member is fixed. The wire-like transmission member can be two-dimensionally held by the sheet member.

(3) The orientation recognition mark may be provided at a position close to a tip end with respect to the connector. Whether or not the connector has successfully been connected to the target connector can be easily checked.

(4) The holding member may include an extending edge portion from which the wire-like transmission member extends. The wire-like transmission member may include an extending end portion that extends toward an outer side from the extending edge portion. The connector may be attached to the extending end portion. The connector attached to the extending end portion extending from the extending edge portion of the holding member of the wire-like transmission member is liable to be inclined with respect to the holding member. In such a case, the robot can recognize the orientation of the connector based on the orientation recognition mark, and hold the connector in the orientation appropriate for connection to the target connector.

(5) The orientation recognition mark may be a mark for enabling recognition of at least an inclined orientation about an axis along the extending edge portion. The connector attached to the extending end portion extending from the extending edge portion of the holding member of the wire-like transmission member is mainly liable to be inclined about the axis along the extending edge portion. In view of this, by providing the mark for enabling recognition of the inclined orientation about the axis along the extending edge portion as the orientation recognition mark, the robot can appropriately recognize the inclination of the connector.

(6) The extending end portion and the connector may be supported in a cantilevered manner at a position located outside of the extending edge portion of the holding member. The position and the orientation of the connector with respect to the holding member are maintained within a certain range in some degree. Therefore, recognition and holding operation of the connector by the robot can be easily performed.

(7) An orientation correction guide being configured to correct an orientation of the connector with respect to a robot holding part in response to holding operation of the robot holding part may be formed on the connector. The orientation of the connector with respect to the robot holding part can be corrected in response to the holding operation of the robot holding part, and thus the connector can be easily held in the orientation appropriate for connection to the target connector.

Details of Embodiments of Present Disclosure

Specific examples of a wiring member according to the present disclosure will be described below with reference to the drawings. Note that the present disclosure is not limited to these examples, and is recited in Claims and intended to include all of the modifications made within the scope of Claims and its equivalent meanings.

First Embodiment

Figure 2:
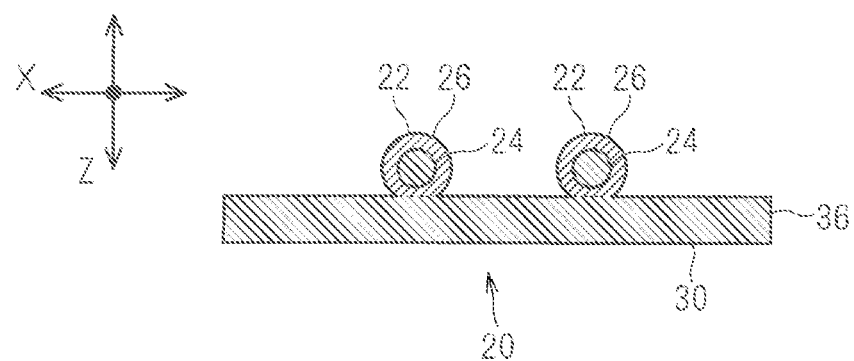
FIG. 2 is a schematic cross-sectional diagram taken along the line II-II of FIG. 1.
Figure 3:
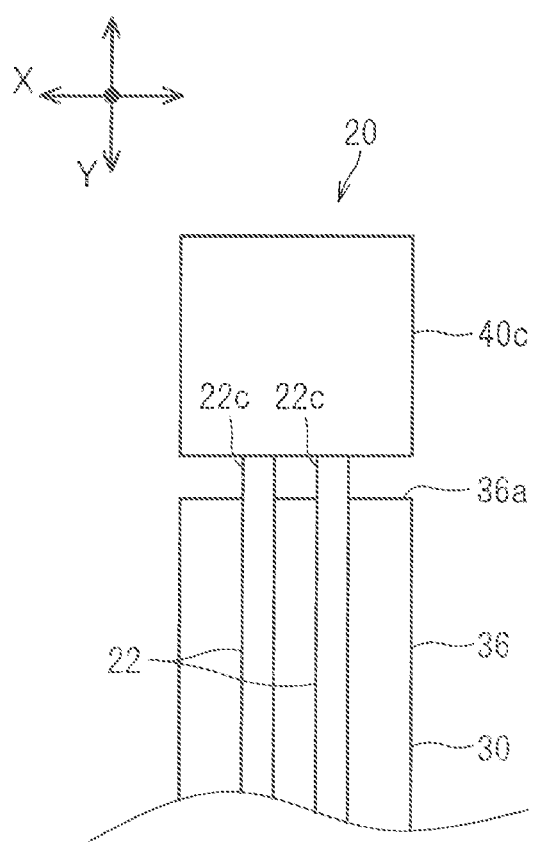
FIG. 3 is a schematic plan view illustrating one terminal part of the wiring member.
Figure 4:
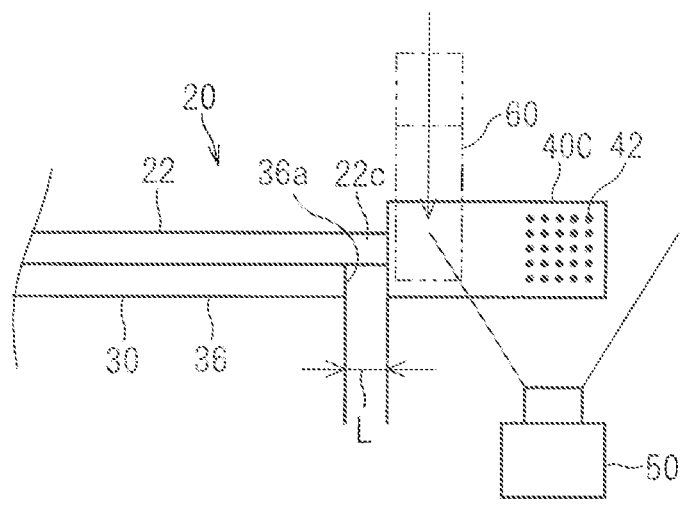
FIG. 4 is a schematic side view of the above-mentioned terminal part.
Figure 5:
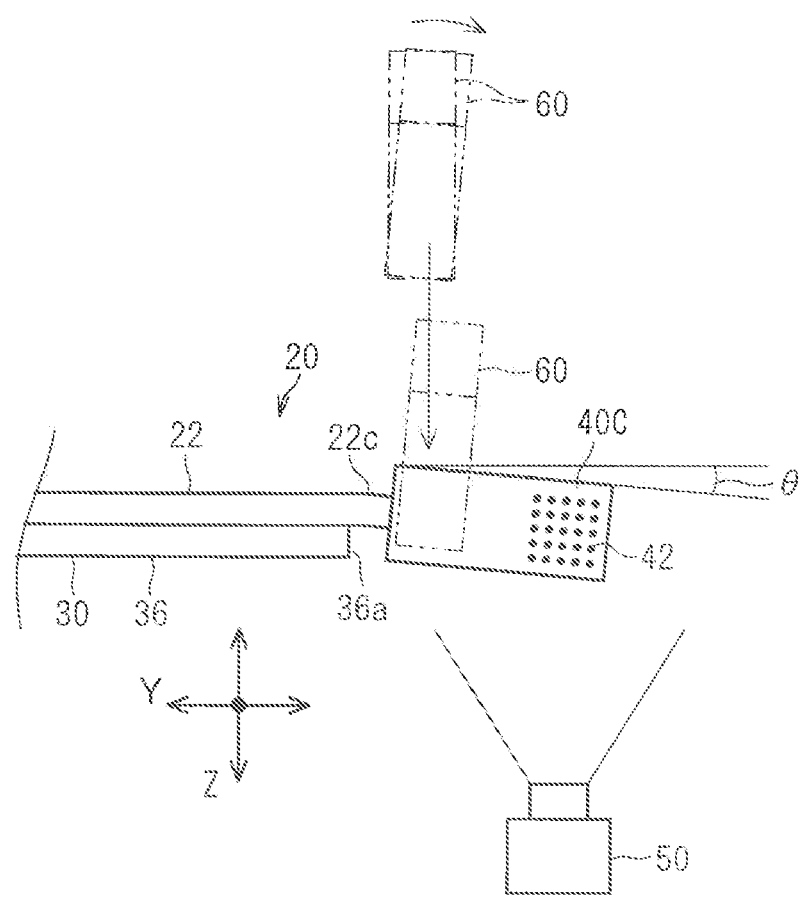
FIG. 5 is a schematic side view of the above-mentioned terminal part.

A wiring member according to the first embodiment will be described below. FIG. 1 is a schematic plan view illustrating a wiring member 20, FIG. 2 is a schematic cross-sectional diagram taken along the line II-II of FIG. 1, FIG. 3 is a schematic plan view illustrating one terminal part of the wiring member 20, FIG. 4 is a schematic side view of the terminal part, and FIG. 5 is a schematic side view illustrating a case in which a connector is inclined in FIG. 4. In FIG. 4 and FIG. 5, an image capturing apparatus 50 and a robot holding part 60 are illustrated. Note that meaning of the X direction, the Y direction, and the Z direction shown in each diagram will be described later.

The wiring member 20 includes wire-like transmission members 22, a holding member 30, and connectors 40A, 40B, and 40C.

The wire-like transmission members 22 are wire-like members that transmit electricity or light. The holding member 30 is a member that holds the wire-like transmission members 22 in a two-dimensionally positioned state. The connectors 40A, 40B, and 40C are components that are connected to components that are mounted to a vehicle. When the connectors 40A, 40B, and 40C are connected to target connectors 48 of the components mounted to a vehicle, the wire-like transmission members 22 and the components are connected electrically, or are connected so as to be capable of transmission and reception of optical signals. Note that the target connectors 48 are provided in the components mounted to a vehicle, and thus it is assumed that the target connectors 48 are supported in the vehicle at fixed positions.

In a state in which the wiring member 20 is mounted to a vehicle, the plurality of connectors 40A, 40B, and 40C are connected to respective components mounted to the vehicle. In this manner, transmission and reception of electric signals, transmission and reception of power, and transmission and reception of optical signals are performed to and/or from the components mounted to the vehicle. In other words, the wiring member 20 is a wiring component that connects the components mounted to the vehicle to each other.

Each component will be described more specifically.

It is only necessary that the wire-like transmission member 22 be a wire-like member that transmits electricity, light, or the like. For example, the wire-like transmission member may be a general electric wire including a core wire and a coating around the core wire, or may be a bare conducting wire, a shield wire, an enameled wire, a nichrome wire, an optical fiber, or the like.

As the wire-like transmission member that transmits electricity, various signal lines and various power lines may be used. The wire-like transmission member that transmits electricity may be used as an antenna, a coil, or the like that transmits or receives a signal or power to or from a space.

The following description herein will be given on the assumption that the wire-like transmission member 22 is the general electric wire 22 (hereinafter simply referred to as an electric wire 22). The electric wire 22 includes a core wire 24 as a transmission line main body, and an insulating coating 26 as the coating 26 that covers the core wire 24. Each description related to the electric wire 22 can be applied to each example of the wire-like transmission member 22, except for a configuration to which the description cannot be applied.

The core wire 24 includes one or a plurality of element wires. The element wires are made of a conductor, such as copper, a copper alloy, aluminum, and an aluminum alloy. When the core wire 24 includes a plurality of element wires, the plurality of element wires may be twisted together. The insulating coating 26 is formed by a resin material, such as polyvinyl chloride (PVC) and polyethylene (PE), being extruded around the core wire 24, for example. Here, the electric wire 22 is a so-called circular electric wire, with its horizontal cross-section having a circular shape.

The holding member 30 is a member that holds the electric wires 22 two-dimensionally in a positioned state. It is only necessary that the holding member 30 be capable of holding the electric wires 22 two-dimensionally in a positioned state in a state that the holding member 30 is placed at an operation position or the like. Thus, the holding member 30 may be an easily bendable flexible sheet-like member. The holding member 30 may be a sheet-like member having such rigidity as to be capable of holding the electric wires 22 two-dimensionally in a positioned state while the holding member 30 is bent, or may be a sheet-like member having such rigidity as to be capable of holding the electric wires 22 two-dimensionally in a positioned state while the holding member 30 keeps its flat state. The holding member 30 may have a part having a three-dimensional shape, such as by being partially provided with an upright wall.

The following description herein will be given on the assumption that the holding member 30 is a bendable sheet member 30. Each description related to the sheet member 30 can be applied to the holding member, except for a configuration to which the description cannot be applied.

A material constituting the sheet member 30 is not particularly limited. However, it is preferable that the sheet member 30 be made of a material including resin such as polyvinyl chloride (PVC), polyethylene terephthalate (PET), and polypropylene (PP). The sheet member 30 may be a sheet member with its inside being uniformly filled, or may be a non-woven sheet or the like. The sheet member 30 may include a material such as metal. It is preferable that the sheet member 30 have flexibility that allows the sheet member 30 to be easily bent in the thickness direction. The sheet member 30 may be a single layer, or may be a stack of a plurality of layers. In a case that the sheet member 30 is a stack of a plurality of layers, for example, a resin layer and another resin layer may be stacked. Alternatively, for example, a resin layer and a metal layer may be stacked.

The electric wires 22 are fixed onto one main surface of the sheet member 30. On the one main surface of the sheet member 30, the electric wires 22 are fixed along certain paths.

The number of electric wires 22 fixed onto the one main surface of the sheet member 30 may be one or more than one. The paths of the electric wires 22 on the sheet member 30 may each be a straight line, or a path that bends halfway. When the plurality of electric wires 22 are fixed onto the one main surface of the sheet member 30, the plurality of electric wires 22 may or may not branch halfway.

Here, the plurality of electric wires 22 are fixed onto the one main surface of the sheet member 30. The path of each electric wire 22 is set to avoid disposition of components as a connection target in a vehicle and other components between components. Here, the plurality of electric wires 22 are held by the holding member 30 so that the plurality of electric wires 22 branch halfway. In the example illustrated in FIG. 1, end portions of the plurality of electric wires 22 on one side are collected together at one position. Parts close to the end portions of the plurality of electric wires 22 on the one side are fixed onto the sheet member 30 in a linear and parallel state. Intermediate parts of the plurality of electric wires 22 branch into a plurality of parts. Parts close to end portions of one branching group of electric wires 22 on another side are fixed onto the sheet member 30 in a linear and parallel state and are bent sideways halfway. Parts close to end portions of another branching group of electric wires 22 on the another side keep the parallel state, are bent outward, and are bent at a plurality of positions (here, two positions) and extend outward.

The sheet member 30 is formed into a shape that extends along the paths of the plurality of electric wires 22. Here, the sheet member 30 includes a first band-like part 32 that holds the parts close to the ends of the plurality of electric wires 22 on the one side, a second band-like part 34 that holds the parts close to the end portions of the one branching group of electric wires 22 on the another side, and a third band-like part 36 that holds the parts close to the end portions of the another branching group of electric wires 22 on the another side.

The first band-like part 32 is formed into a linear band-like shape that can hold the plurality of electric wires 22 in a parallel state. The second band-like part 34 is formed into such a linear band-like shape that linearly extends from the first band-like part 32 and has a width smaller than that of the first band-like part 32. The third band-like part 36 is formed into such a band-like shape that extends toward an outer side from a boundary part between the first band-like part 32 and the second band-like part 34, is bent halfway and extends in a direction along the second band-like part 34, and is further bent halfway and extends toward an outer side of the second band-like part 34.

The formation of the sheet member 30 into a shape extending along the paths of the plurality of electric wires 22 allows for reduction of interference between the sheet member 30 and other components, reduction in weight, and the like. The sheet member 30 need not necessarily be formed into a shape extending along the paths of the plurality of electric wires 22, and may be formed into another shape such as a rectangular shape.

The sheet member 30 includes extending edge portions 32a, 34a, and 36a from which the electric wires 22 extend.

Here, the edge of an external end portion of the first band-like part 32 is the extending edge portion 32a. The end portions of the plurality of electric wires 22 on the one side extend outward from the extending edge portion 32a. Parts of the end portions of the plurality of electric wires 22 on the one side extending outward from the extending edge portion 32a are extending end portions 22a.

Similarly, the edge of an external end portion of the second band-like part 34 is the extending edge portion 34a. The end portions of the another branching group of electric wires 22 on the another side extend outward from the extending edge portion 34a. Parts of the end portions of the another branching group of electric wires 22 on the another side extending outward from the extending edge portion 34a are extending end portions 22b.

Similarly, the edge of an external end portion of the third band-like part 36 is the extending edge portion 36a. The end portions of the another branching group of electric wires 22 on the another side extend outward from the extending edge portion 36a. Parts of the end portions of the another branching group of electric wires 22 on the another side extending outward from the extending edge portion 36a are extending end portions 22c.

As the mode of fixing the electric wires 22 and the sheet member 30 to each other, contact part fixing may be used, non-contact part fixing may be used, or both of the modes may be used at the same time. Here, the contact part fixing is a mode in which the electric wires 22 aid the sheet member 30 are fixed to each other with their contact parts being bonded to each other. Further, the non-contact part fixing is a fixing mode other than the contact part fixing. For example, the non-contact part fixing is a mode to maintain the electric wires 22 and the sheet member 30 in a fixed state by using a thread, another sheet member, an adhesive tape, or the like to press the electric wires 22 onto the sheet member 30, or by using a thread, another sheet member, an adhesive tape, or the like to interpose the electric wires 22 and the sheet member 30 therebetween in a manner of surrounding the electric wires 22 and the sheet member 30, for example. The following description will be given on the assumption that the electric wires 22 and the sheet member 30 are in a state of contact part fixing. Each description related to the contact part fixing can also be applied to the non-contact part fixing, except for a configuration to which the description cannot be applied.

As the mode of the contact part fixing, contact part indirect fixing may be used, contact part direct fixing may be used, or both of the modes may be used at the same time in different areas. Here, the contact part indirect fixing is a mode in which the electric wires 22 and the sheet member 30 are indirectly bonded and fixed to each other with the use of an interposing member, such as an adhesive, a pressure sensitive adhesive, and a double-sided adhesive tape that is provided between the wire-like transmission member and the first sheet member 32. Further, the contact part direct fixing is a mode in which the electric wires 22 and the sheet member 30 are directly bonded and fixed to each other without the use of a separately provided adhesive or the like. In the contact part direct fixing, for example, the electric wires 22 and the sheet member 30 may be bonded and fixed to each other with a resin contained in at least one of the electric wires 22 and the sheet member 30 being melted. The following description will be given on the assumption that the electric wires 22 and the sheet member 30 are in a state of contact part direct fixing. Each description related to the contact part direct fixing can also be applied to the contact part indirect fixing, except for a configuration to which the description cannot be applied.

When such a state of contact part direct fixing is formed, for example, the resin may be melted with heat, or may be melted with a solvent. In other words, the state of contact part direct fixing may be a state of contact part direct fixing achieved with heat, or may be a state of contact part direct fixing achieved with a solvent. It is preferable that the state of contact part direct fixing be the state of contact part direct fixing achieved with heat.

In this case, the means of forming the state of contact part direct fixing is not specifically limited, and various means including publicly known means such as welding, fusion, and fusion welding may be used. For example, when the state of contact part direct fixing achieved with heat is formed with welding, various welding means such as ultrasonic welding, heat pressure welding, hot air welding, and high frequency welding can be adopted. Further, when the state of contact part direct fixing is formed with these means, the electric wires 22 and the sheet member 32 are in a state of contact part direct fixing achieved with the means.

Specifically, for example, when the state of contact part direct fixing is formed with ultrasonic welding, the electric wires 22 and the sheet member 32 are in a state of contact part direct fixing achieved with ultrasonic welding. A part at which the state of contact part direct fixing achieved with heat is formed with welding (fixing part between the electric wires 22 and the sheet member 32) may be referred to as a welding part, and of the part, a fixing part achieved with ultrasonic welding may be referred to as an ultrasonic welding part and a fixing part achieved with heat pressure welding may be referred to as a heat pressure welding part, for example.

In a case of the contact part direct fixing, only the resin contained in the coating of the electric wires 20 may be melted, or only the resin contained in the sheet member 30 may be melted. In these cases, the melted resin of one member may be bonded to an outer surface of the other member, which may result in formation of a relatively clear interface. Further, in a case of the contact part direct fixing, both of the resin contained in the coating of the electric wires 20 and the resin contained in the sheet member 30 may be melted. In this case, both of the resins may be mixed together, which may not result in formation of a clear interface. In particular, for example, when the coating of the electric wires 20 and the sheet member 30 contain resins that are relatively highly compatible to each other, such as when the same resin material is used, a clear interface may not be formed due to mixing of both of the resins.

The connectors 40A, 40B, and 40C are attached to end portions of the electric wires 22. In other words, the extending end portions 22a, 22b, and 22c and the connectors 40A, 40B, and 40C are supported in a cantilevered manner at positions located outside of the extending edge portions 32a, 34a, and 36a of the sheet member 30. In other words, the connectors 40A, 40B, and 40C are located outside of the extending edge portions 32a, 34a, and 36a of the sheet member 30, and are supported in a horizontal state or an inclined orientation so as not to entirely sag downward.

It is sufficient that the connectors 40A, 40B, and 40C be supported in a cantilevered manner in a parallel orientation with respect to the sheet member 30. However, the orientation of the connectors 40A, 40B, and 40C with respect to the sheet member 30 depends upon the thickness and the number of electric wires 22, the weight of the connectors 40A. 40B, and 40C, and the like For example, with respect to a front part of the extending edge portions 32a, 34a, and 36a of the sheet member 30, the connectors 40A, 40B, and 40C may be inclined within a range of ±10 degrees, or may be inclined within a range of ±5 degrees (see the angle θ of FIG. 5). To reduce inclination of the connectors 40A, 40B, and 40C to the extent possible, the length of the electric wires 22 extending from the extending edge portions 32a, 34a, and 36a may be reduced to the extent possible. For example, a distance L (see FIG. 4) between the extending edge portions 32a, 34a, and 36a and the connectors 40A, 40B, and 40C may be 10 mm, may be 7 m, may be 5 mm, or may be 3 mm.

The connectors 40A, 40B, and 40C are components for connecting the electric wires 22 to other components. Given that the connectors 40A, 40B, and 40C are electric connectors, cavities capable of accommodating terminals attached to end portions of the electric wires 22 are formed in the connectors 40A, 40B, and 40C, such that the connectors 40A. 40B, and 40C are configured to be capable of being fitted and connected to the target connectors 48. The connectors 40A, 40B, and 40C may be optical connectors.

The connector 40A is connected to the end portions of the plurality of electric wires 22 on the one side. In other words, the connector 40A is attached to the extending end portions 22a of the plurality of electric wires 22.

The connector 40B is connected to the end portions of the another branching group of electric wires 22 on the another side. In other words, the connector 40B is attached to the extending end portions 22b of the plurality of electric wires 22.

The connector 40C is connected to the end portions of the another branching group of electric wires 22 on the another side. In other words, the connector 40C is attached to the extending end portions 22c of the plurality of electric wires 22.

The end portions of the electric wires 22 need not necessarily extend from the sheet member 30, and the connectors 40A, 40B, and 40C need not necessarily be attached to the extending end portions 22a, 22b, and 22c of the electric wires 22. The connectors 40A, 40B, and 40C may be fixed to the edge portion of the sheet member 30, without the end portions of the electric wires 22 extending from the sheet member 30.

The connectors 40A, 40B, and 40C are provided with an orientation recognition mark 42. The following will mainly describe the connector 40C and the orientation recognition mark 42 provided on the connector 40C. Note that, here, an extending direction of the extending end portion 22c of the electric wire 22 is represented by the Y direction, a direction in parallel with the sheet member 30 and perpendicular to the Y direction (or an extending direction of the extending edge portion 36a) is represented by the X direction, and a direction perpendicular to the X direction and the Y direction (or a thickness direction of the sheet member 30) is represented by the Z direction.

The orientation recognition mark 42 is a mark that enables recognition of the orientation of the connector 40C through the use of a computer performing image recognition processing, orientation recognition processing, and the like, based on an image captured by the image capturing apparatus.

For example, a mark such as a plurality of dots, straight lines provided in a certain pattern can be used as a mark for enabling recognition of the orientation of the connector 40C through the image recognition processing and the orientation recognition processing. For example, a dot code including a plurality of dots provided in a latticed-dot shape, a QR code (trademark), an AR marker, or the like is known as a mark for enabling recognition of the orientation of an object provided with the mark, and these may be used as the orientation recognition mark. The orientation of the connector 40C can be recognized by capturing an image of the dot code, the QR code, the AR marker, or the like as described above, performing image recognition processing such as binarization processing, and performing orientation recognition processing such as recognition processing of the size, the orientation, and the like of the image based on the binarization image or the like. When a mark allowing for addition of other information, such as the QR code and the AR marker, is used as the orientation recognition mark, the type of the connectors 40A, 40B, and 40C as well as the orientation of the connectors 40A, 40B, and 40C can be identified by a computer.

The orientation recognition mark 42 may be any mark as long as an image of the mark can be captured by the image capturing apparatus and image processing can be performed. As the orientation recognition mark 42, a mark may be printed on the connector 40C, a printed sticker of the orientation recognition mark 42 may be applied, or a mark may be formed as a projecting and recessed shape obtained by a die. The printing may be printing using an ink, or may be printing obtained by changing the quality of the surface using a laser or the like. The orientation recognition mark 42 may be recorded three-dimensionally by the holographic technology.

The orientation recognition mark 42 may be a mark for enabling recognition of the inclined orientation of the connector 40C about an axis along the extending edge portion 36a (axis along the X direction). The connector 40C is liable to be inclined about the axis along the extending edge portion 36a (axis along the X direction). Thus, if the orientation recognition mark 42 is a mark for enabling recognition of at least the inclined orientation of the connector 40C about the axis (axis along the X direction), the computer can be allowed to recognize the orientation of the connector 40C in the direction in which the connector 40C is liable to be inclined.

The orientation recognition mark 42 may be provided at a position close to the tip end with respect to the connector 40C, that is, a position closer to the tip end than to the center in the front and back direction (connection direction) of the connector 40C. With this configuration, for example, provided that the connector 40C is configured to be internally fitted to the target connector 48, when the connector 40C is connected to the target connector 48, all or a part of the orientation recognition mark 42 is concealed by the target connector 48 (see FIG. 6). Thus, by recognizing whether or not all or a part of the orientation recognition mark 42 is concealed by the target connector 48 while the connector 40C is connected to the target connector 48, whether or not the connector 40C is fully connected to the target connector 48 can be determined.

The position recognition of the connectors 40A, 40B, and 40C may be performed based on the orientation recognition mark 42.

An operation example in which the wiring member 20 is assembled to the vehicle by using the orientation recognition mark 42 will be described. The following description assumes a case in which the wiring member 20 is automatically assembled to the vehicle by using a robot such as a vertical articulated robot.

In this case, first, the wiring member 20 is spread out and placed near the position as an assembly target of the vehicle. The placement position may be on the vehicle itself, or may be on a work table near the vehicle. Further, the wiring member 20 may be supported near the assembly target position by using another robot. In a state in which the wiring member 20 is spread out, each electric wire 22 is kept in a state extending along a predetermined path by the sheet member 30. Further, the connectors 40A, 40B, and 40C are attached to the end portions of the extending end portions 22a, 22b, and 22c extending from the extending edge portions 32a, 34a, and 36a, respectively. Thus, the connectors 40A, 40B, and 40C are held substantially at fixed positions with respect to the sheet member 30.

Further, the connectors 40A, 40B, and 40C are held at the robot holding parts, and are connected to the target connectors 48. In this case, the extending end portions 22a, 22b, and 22c of the electric wires 22 extend from the extending edge portions 32a, 34a, and 36a of the sheet member 30, and thus the connectors 40A, 40B, and 40C may be inclined.

If the robot holding parts hold the connectors 40A, 40B, and 40C in an inclined orientation, the connectors 40A, 40B, and 40C may not be successfully connected even when the connectors 40A, 40B, and 40C are intended to be inserted into the target connectors 48.

In view of this, as illustrated in FIG. 4 and FIG. 5, the image of the orientation recognition mark 42 is captured by the image capturing apparatus 50. Then, using the computer, the image processing and the orientation recognition processing are executed based on the captured image, so as to recognize the inclined orientation of the connector 40C. The following will mainly describe the connector 40C, but the processing and the operation can also be performed in a similar manner for the other connectors 40A and 40B.

Then, the orientation of the robot holding part 60 is changed and the robot holding part 60 holds the connector 40C, in such a manner that the connector 40C is held in a predetermined orientation with respect to the robot holding part 60, based on the recognition results of the orientation. For example, as illustrated in FIG. 4, when the connector 40C has substantially a horizontal orientation with respect to the sheet member 30, the robot holding part 60 holds the connector 40C in an orientation perpendicular to the sheet member 30. Further, for example, as illustrated in FIG. 5, when the connector 40C is included with respect to the sheet member 30 by the angle θ, the robot holding part 60 holds the connector 40C in a state in which the connector 40C is inclined by angle θ from the orientation perpendicular to the sheet member 30. With this configuration, the robot holding part 60 can hold the connector 40C so that the connector 40C has a predetermined orientation with respect to the robot holding part 60 according to the inclined orientation of the connector 40C.

With reference to FIG. 5, description has been given by taking an example of a case in which the connector 40C is inclined about the axis along the extending edge portion 36a (axis along the X direction). Also in a case in which the connector 40C is inclined about the axis along the Y direction and a case in which the connector 40C is inclined about the axis along the Z direction, similarly, the robot holding part 60 can hold the connector 40C so that the connector 40C has a predetermined orientation with respect to the robot holding part 60 in a manner similar to the above by recognizing the inclination of the connector 40C and holding the connector 40C in a state in which the robot holding part 60 is inclined according to the inclination.

Note that the connector 40C is liable to be inclined about the axis along the extending edge portion 36a (axis along the X direction) due to the weight of the connector 40C or the like. In particular, if the connector 40C is a connector having a plurality of poles, the plurality of extending end portions 22c extend from the extending edge portion 36a, and the plurality of extending end portions 22c are connected to the connector 40C. In such a case, the connector 40C is supported by the plurality of extending end portions 22c. Thus, it is considered that the connector 40C is held at a fixed orientation in some degree about the axis along the Y direction and the axis along the Z direction, whereas the connector 40C is liable to be inclined about the axis along the extending edge portion 36a (axis along the X direction). Based on similar consideration, the connector 40C is held at a fixed position in some degree in the X direction and the Y direction with respect to the sheet member 30. In contrast, it is also considered that the position of the connector 40C is relatively liable to be changed in the Z direction (the thickness direction of the sheet member 30) with respect to the sheet member 30.

In view of this, if the orientation recognition mark 42 enables recognition of at least the inclined orientation of the connector 40C about the axis along the extending edge portion 36a (axis along the X direction), in many cases, the robot holding part 60 can hold the connector 40C so that the connector 40C has a predetermined orientation with respect to the robot holding part 60.

To enable recognition of the inclined orientation of the connector 40C about the axis along the extending edge portion 36a (axis along the X direction), the orientation recognition mark 42 may be provided on the side surface of the connector 40C. Even if the orientation recognition mark 42 is provided on the upper surface of the connector 40C or the like, the inclined orientation of the connector 40C about the axis along the extending edge portion 36a (axis along the X direction) can be recognized based on distortion from a predetermined shape of the orientation recognition mark 42 or the like. Further, the orientation recognition mark 42 provided on the connector 40C also serves as a mark for allowing the computer to recognize the position of the connector 40C in the Z direction. The robot holding part 60 can more securely hold the connector 40C by moving mainly in the Z direction and holding the connector 40C. In this case, the position of the connector 40C with respect to the robot holding part 60 can be easily aligned to be fixed and the position of the connector 40C with respect to the robot holding part 60 can be easily recognized by recognizing the position of the connector 40C in the Z direction, based on the orientation recognition mark 42 provided on the connector 40C.

Figure 6:
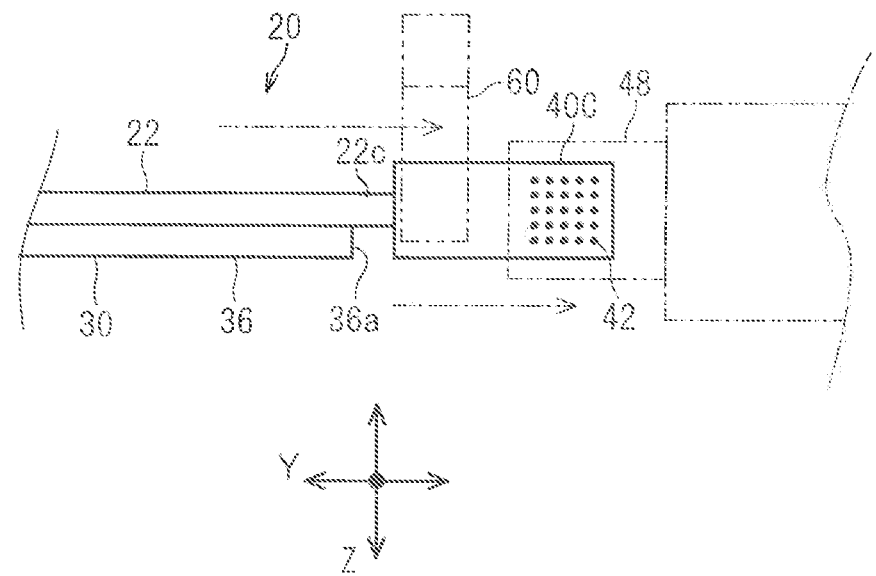
FIG. 6 is a schematic side view illustrating a state in which a connector is connected to a target connector.

As described above, after the robot holding part 60 holds the connector 40C, as illustrated in FIG. 6, the robot holding part 60 moves the connector 40C toward the target connector 48. The electric wires 22 connected to the connector 40C and the sheet member 30 that supports the electric wires 22 move along with the movement of the connector 40C. Then, the robot holding part 60 connects the connector 40C to the target connector 48. In this case, the connector 40C is held in a predetermined orientation with respect to the robot holding part 60, and thus positioning between the connector 40C and the target connector 48 can be easily performed, and connection operation of the connector 40C can be easily and securely performed.

When the connector 40C is connected to the target connector 48, all or a part of the orientation recognition mark 42 provided at a position close to the tip end of the connector 40C is concealed by the target connector 48. FIG. 6 illustrates a state in which the orientation recognition mark 42 enters the target connector 48 in such a manner that all of the orientation recognition mark 42 is concealed.

After the robot holding part 60 connects the connector 40C to the target connector 48, an image of the connected part is captured. If the orientation recognition mark 42 is not recognized in the captured image, it can be determined that the connector 40C is correctly connected to the target connector 48. Note that, in such settings that a part of the orientation recognition mark 42 is concealed in a connected state between the connector 40C and the target connector 48, if only a predetermined remaining part of the orientation recognition mark 42 is recognized in the captured image, it can be determined that the connector 40C is correctly connected to the target connector 48.

The advantage achieved by the configuration that the orientation recognition mark 42 is provided at a position close to the tip end of the connector 40C also lies in that the configuration enables determination as to whether or not the robot holding part 60 has successfully held the connector 40C in a predetermined orientation in a state in which the connector 40C is held by the robot holding part 60. Specifically, when the robot holding part 60 connects the connector 40C to the target connector 48, in order not to let the robot holding part 60 interfere with the target connector 48, it is sufficient that the robot holding part 60 hold a position of the connector 40C close to a rear end. By doing so, in a state in which the robot holding part 60 holds the connector 40C, a part of the connector 40C close to the tip end can be exposed as a part that can be recognized from the outside without being concealed by the robot holding part 60. Thus, if the orientation recognition mark 42 is provided at a position close to the tip end of the connector 40C, whether or not the connector 40C is held in a predetermined orientation with respect to the robot holding part 60 can be determined by capturing an image of the orientation recognition mark 42 of the connector 40C by the image capturing apparatus 50 and recognizing the orientation of the connector 40C based on the image capturing results in a state in which the robot holding part 60 holds the connector 40C.

The other connectors 40A and 40B may be connected to the target connectors 48 by the robot holding part 60 as well in a manner similar to the above. With this configuration, the wiring member 20 can be automatically assembled to the vehicle. A part of the assembly operation of the wiring member 20 may be manually performed, for example.

According to the wiring member 20 configured as described above, the electric wires 22 being a wire-like transmission member are held in a two-dimensionally positioned state by the sheet member 30 being a holding member, and the connector 40C is attached to an end portion of the electric wires 22. Thus, the positions of the connectors 40A, 40B, and 40C are determined in some degree by the sheet member 30, and the robot can easily hold the connectors 40A, 40B, and 40C by using the robot holding part 60. Further, the connectors 40A, 40B, and 40C are provided with the orientation recognition marks 42. Thus, the robot can recognize the orientations of the connectors 40A. 40B, and 40C based on the orientation recognition marks 42, and based on the recognition results, the robot can perform holding of the connectors 40A, 40B, and 40C, connection operation to the target connectors 48, and the like. The robot holding part 60 can hold the connectors 40A. 40B, and 40C in a predetermined orientation, and can thus easily and securely perform the holding and the connection operation. Therefore, the wiring member 20 is appropriate for performing the operation of connecting the connectors 40A. 40B, and 40C to the target connectors 48 by using the robot.

Further, the holding member is the sheet member 30, and can thus easily two-dimensionally hold the electric wires 22. Further, if the sheet member 30 is easily deformed in the thickness direction, the electric wires 22 can be easily disposed along the assembly target position by deforming the sheet member 30 in the thickness direction according to the shape of the assembly target position or the like.

In particular, of the electric wires 22, the connectors 40A, 40B, and 40C that are attached to the extending end portions 22a, 22b, and 22c extending from the extending edge portions 32a, 34a, and 36a of the sheet member 30 are liable to be inclined with respect to the sheet member 30. In such a case, the robot can recognize the orientations of the connectors 40A, 40B, and 40C based on the orientation recognition marks 42, and hold the connectors 40A, 40B, and 40C in orientations appropriate for connection to the target connectors 48.

In addition, if the orientation recognition mark 42 is a mark for enabling recognition of at least inclined orientation about an axis along the extending edge portions 32a, 34a, and 36a, the robot can appropriately recognize the inclination of the connectors 40A. 40B, and 40C in a direction in which the connectors 40A, 40B, and 40C are liable to be inclined.

Figure 7:
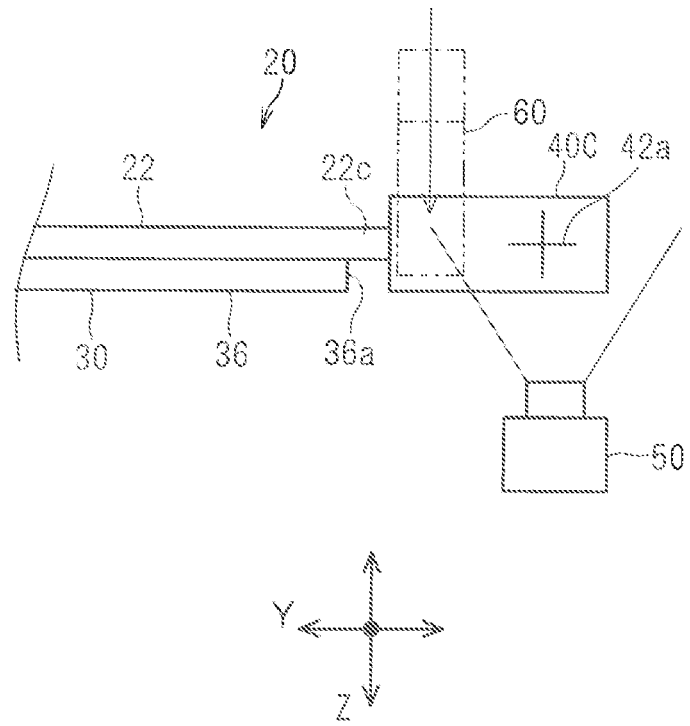
FIG. 7 is a diagram illustrating an orientation recognition mark according to a modification.

Other than the marks illustrated in the above, the mark for enabling recognition of the inclined orientation about the axis along the extending edge portions 32a, 34a, and 36a may be a line along the front and back direction of the connectors 40A, 40B, and 40C provided on the side surface of the connectors 40A, 40B, and 40C, or may be a line along the vertical direction of the connectors 40A, 40B, and 40C. Further, as illustrated in FIG. 7, the orientation recognition mark 42a may be a cross mark (see FIG. 7) combining a line along the front and back direction and a line along the vertical direction. For example, the orientation recognition mark may include information related to two positions distant along the front and back direction on the side surface of the connectors 40A, 40B, and 40C.

Further, if the orientation recognition mark 42 is provided at a position close to the tip end with respect to the connectors 40A, 40B, and 40C, whether or not the connectors 40A, 40B, and 40C have been correctly connected to the target connectors 48 can be easily checked by checking whether or not all or a part of the orientation recognition mark 42 is concealed, for example, in a state in which the connectors 40A, 40B, and 40C are connected to the target connectors 48.

Further, the extending end portions 22a, 22b, and 22c and the connectors 40A, 40B, and 40C are supported in a cantilevered manner at positions located outside of the extending edge portions 32a, 34a, and 36a of the sheet member 30, and thus the connectors 40A, 40B, and 40C for the sheet member 30 are maintained within a certain range in some degree. Therefore, recognition and holding operation of the connectors 40A, 40B, and 40C by the robot can be easily performed.

{Modifications}

Figure 8:
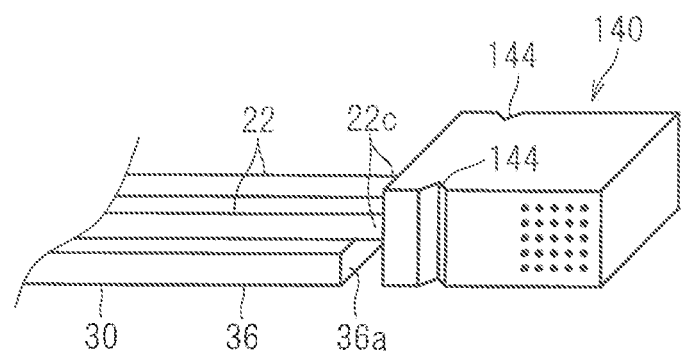
FIG. 8 is a schematic perspective view illustrating a connector according to the first modification.
Figure 8:
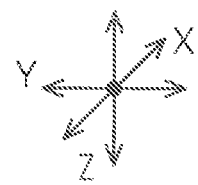
Figure 9:
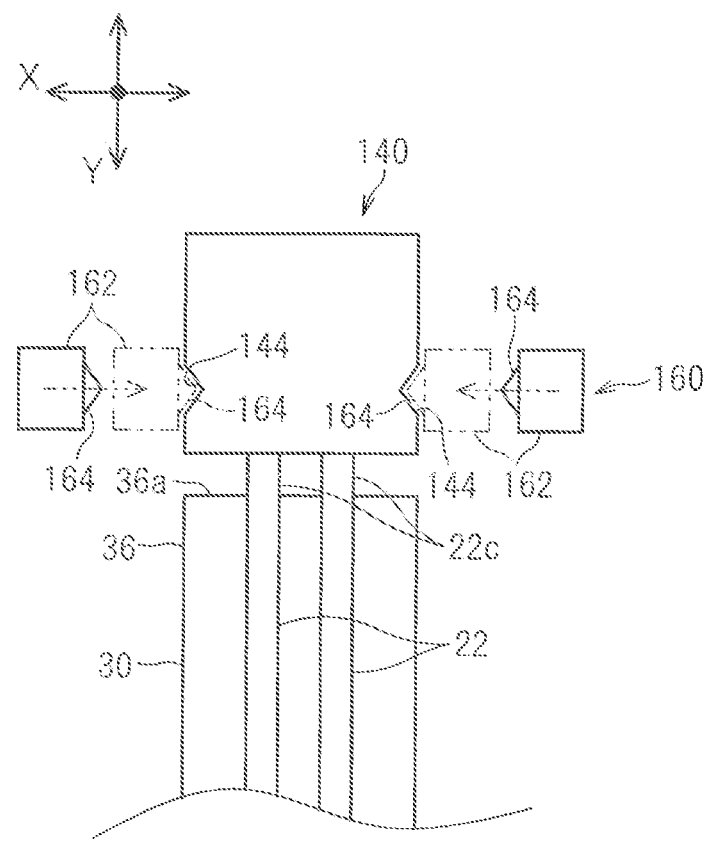
FIG. 9 is a schematic diagram illustrating a state in which the above-mentioned connector is held.

As in the first modification illustrated in FIG. 8 and FIG. 9, orientation correction guides 144 may be provided for a connector 140 corresponding to the connectors 40A, 40B, and 40C. The orientation correction guides 144 are configured to be capable of correcting the orientation of the connector 140 with respect to a robot holding part 160 in response to the holding operation of the robot holding part 160.

Here, the orientation correction guide 144 is a groove along the vertical direction of the connector 140, and is formed into a such shape that the depth dimension is gradually increased toward the center of the groove in the width direction, here, a triangular groove shape.

In contrast, on the inner surface of a pair of holding parts 162 of the robot holding part 160, projections 164 that can be fitted into the orientation correction guides 144, here, elongated projections 164 having a triangular shape in cross-section, are formed.

Further, when the pair of holding parts 162 is closed in a state in which the pair of holding parts 162 is disposed on both of the outer sides of the connector 140, the pair of projections 164 is fitted into the pair of orientation correction guides 144. In this case, the position and the orientation of the connector 140 for the robot holding part 160 are corrected so that the pair of projections 164 comes into contact with the inner surface of the orientation correction guides 144, and the center lines of the pair of projections 164 in the width direction face the center lines of the orientation correction guides 144 in the width direction and extend along the center lines in the width direction.

Thus, the connector 140 is held so that the connector 140 has a more accurate position and orientation with respect to the robot holding part 160.

The orientation correction guides 144 according to the first modification guide so that the orientation of the connector 140 is fixed with respect to the robot holding part 160. More specifically, the orientation correction guides 144 guide so that the orientation is such that the front and back direction of the connector 140 is perpendicular to the extending direction of the pair of holding parts 162. Further, the orientation correction guides 144 guide so that the connector 140 is disposed at a fixed position with respect to the robot holding part 160 in the front and back direction of the connector 140.

With this configuration, the orientation of the connector 140 with respect to the robot holding part 160 can be corrected in response to the holding operation of the robot holding part 160, and thus the connector 140 can be easily held in an orientation appropriate for connection to the target connector.

As described above, in consideration of the subsequent connector connection operation, it is sufficient that the robot holding part 160 hold the position close to the rear end of the connector 140. Thus, in this respect, it is sufficient that the orientation correction guides 144 be formed at positions close to the rear end of the connector 140.

Figure 10:
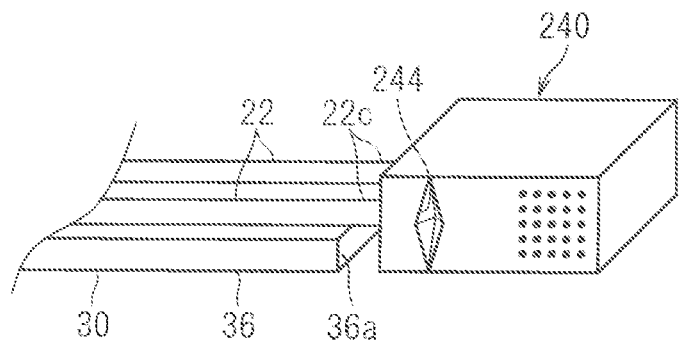
FIG. 10 is a schematic perspective view illustrating a connector according to the second modification.

In the second modification illustrated in FIG. 10, orientation correction guides 244 having another shape are provided for a connector 240 corresponding to the connectors 40A, 408, and 40C. The orientation correction guides 244 guide so that the connector 240 is disposed at a fixed position with respect to the robot holding part also in the extending direction of the pair of holding parts 162 (vertical direction of the connector 140), in addition to the guide function of the orientation correction guides 144.

Here, the orientation correction guide 244 is formed into a recessed shape having a quadrangular pyramid shape that is recessed with an opening of a rhombus on a side of the connector 240 being the bottom surface. In the pair of holding parts of the robot holding part that holds the connector 240, it is sufficient that projections having a quadrangular pyramid shape according to the recessed shape of the orientation correction guides 244 be formed. Further, when the connector 240 is held by the pair of holding parts, the projections having a quadrangular pyramid shape come into contact with the side surface of the orientation correction guides 244 recessed into a quadrangular pyramid shape. Further, when the projections of the pair of holding parts are fitted into the orientation correction guides 244 recessed into the quadrangular pyramid shape, the connector 240 is guided so that the connector 240 has a fixed orientation with respect to the pair of holding parts. Further, the connector 240 is guided so that the connector 240 is disposed at a fixed position in the front and back and vertical directions with respect to the pair of holding parts. Thus, the connector 240 is guided so that the connector 240 is more accurately disposed at a fixed position and has a fixed orientation with respect to the robot holding part.

In addition to the above shape, the orientation correction guide 244 may be a shape in which triangular groove shapes cross, a conical shape, or the like.

The above-described first modification and second modification can also be applied to a connector not provided with the orientation recognition mark as a structure that guides the connector in a fixed orientation with respect to the robot holding part.

Further, in the above-described embodiment, the orientation recognition mark may be provided for the target connector 48. With this configuration, when the robot connects the connectors 40A. 40B, and 40C to the target connectors 48, the connection operation can be performed by recognizing the orientation of the target connectors 48 or the like and correcting the orientation of the connectors 40A, 40B, and 40C based on the recognition results. This enables more accurate connection operation.

Note that each configuration described in the above-described embodiment and each modification can be combined as appropriate as long as the combination remains consistent.

EXPLANATION OF REFERENCE SIGNS

20 Wiring member
22 Electric wire (wire-like transmission member)
22a Extending end portion
22b Extending end portion
22c Extending end portion
24 Core wire
26 Coating
30 Sheet member (holding member)
32 First band-like part
32a Extending edge portion
34 Second band-like part
34a Extending edge portion
36 Third band-like part
36a Extending edge portion
40A Connector
40B Connector
40C Connector
42 Orientation recognition mark
42a Orientation recognition mark
48 Target connector
50 Image capturing apparatus
60 Robot holding part
140 Connector
144 Orientation correction guide
160 Robot holding part
162 Holding part
164 Projection
240 Connector
244 Orientation correction guide
L Distance
θ Angle

The invention claimed is:

1. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
the wire-like transmission member is an electric wire including a core wire and a coating around the core wire,
a cavity capable of accommodating a terminal of an end portion of the electric wire is formed in the connector, and
the orientation recognition mark is provided on an outer surface of the connector in a form of being capable of being connected to target connectors.

2. The wiring member according to claim 1, wherein
the holding member is a sheet member including a main surface on which the wire-like transmission member is fixed.

3. The wiring member according to claim 1, wherein
the orientation recognition mark is provided at a position close to a tip end with respect to the connector.

4. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
the holding member includes an extending edge portion from which the wire-like transmission member extends,
the wire-like transmission member includes an extending end portion that extends toward an outer side from the extending edge portion,
the connector is attached to the extending end portion, and
the orientation recognition mark is provided on an outer surface of the connector in a form of being capable of being connected to target connectors.

5. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
the holding member includes an extending edge portion from which the wire-like transmission member extends,
the wire-like transmission member includes an extending end portion that extends toward an outer side from the extending edge portion,
the connector is attached to the extending end portion, and
the orientation recognition mark is a mark for enabling recognition of at least an inclined orientation about an axis along the extending edge portion.

6. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
the holding member includes an extending edge portion from which the wire-like transmission member extends,
the wire-like transmission member includes an extending end portion that extends toward an outer side from the extending edge portion,
the connector is attached to the extending end portion, and
the extending end portion and the connector are supported in a cantilevered manner at a position located outside of the extending edge portion of the holding member.

7. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
an orientation correction guide being configured to correct an orientation of the connector with respect to a robot holding part in response to holding operation of the robot holding part is formed on the connector, and
the orientation recognition mark is provided on an outer surface of the connector in a form of being capable of being connected to target connectors.

8. A wiring member comprising:
a wire-like transmission member;
a holding member configured to hold the wire-like transmission member two-dimensionally in a positioned state; and
a connector being attached to an end portion of the wire-like transmission member, and being provided with an orientation recognition mark, wherein
the orientation recognition mark is provided on a side surface of the connector, and
the orientation recognition mark is provided on an outer surface of the connector in a form of being capable of being connected to target connectors.

9. The wiring member according to claim 8, wherein
the orientation recognition mark is provided at a position close to a tip end with respect to the connector.

* * * * *